Figure 1:
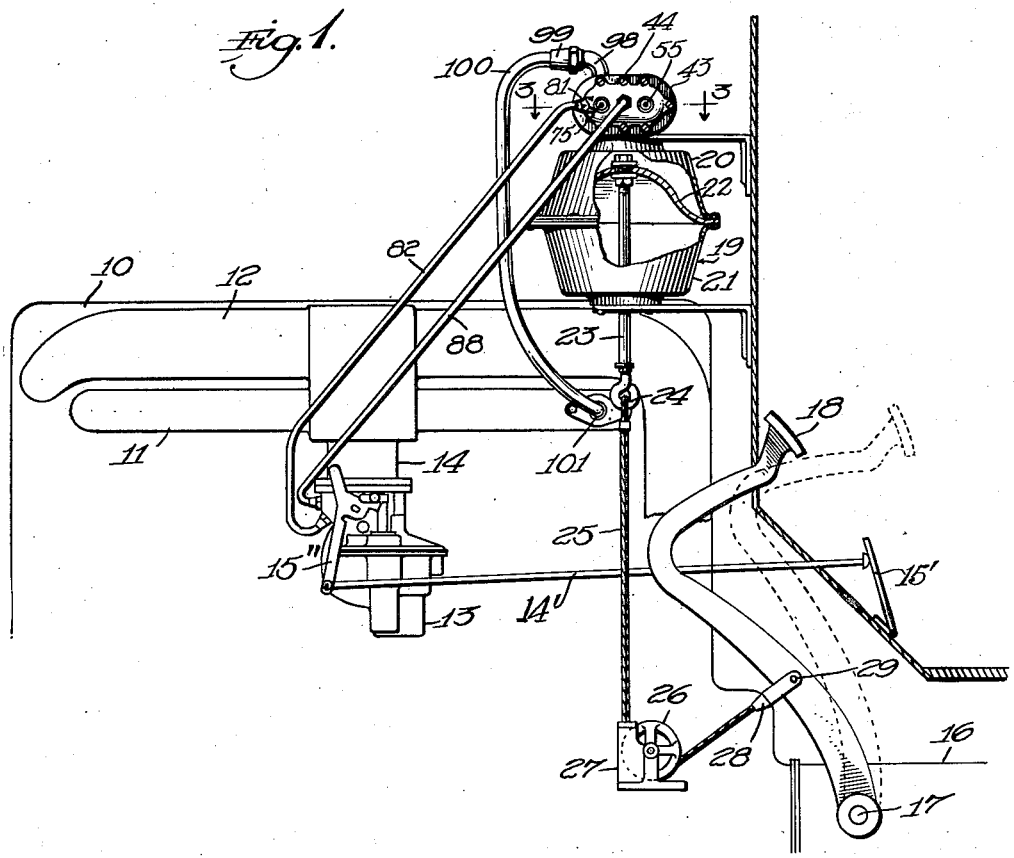

Oct. 8, 1935.  E. G. HILL  2,016,999
AUTOMATIC CLUTCH CONTROL APPARATUS
Filed April 29, 1933  3 Sheets-Sheet 1

Inventor
EDWARD G. HILL
By
C. L. Parker, Jr.
Attorney

Oct. 8, 1935.  E. G. HILL  2,016,999
AUTOMATIC CLUTCH CONTROL APPARATUS
Filed April 29, 1933  3 Sheets-Sheet 2
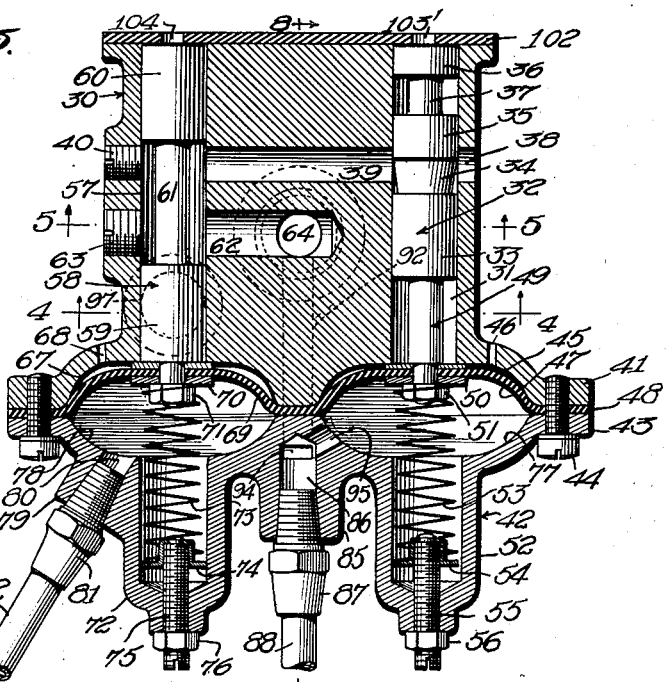
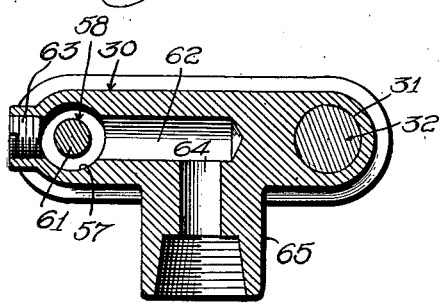
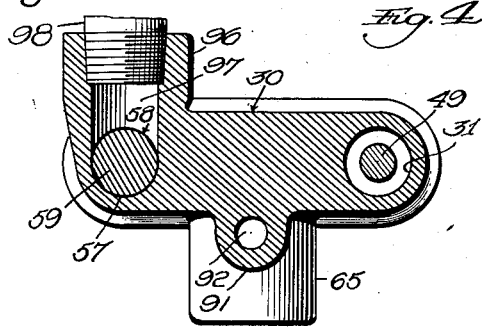
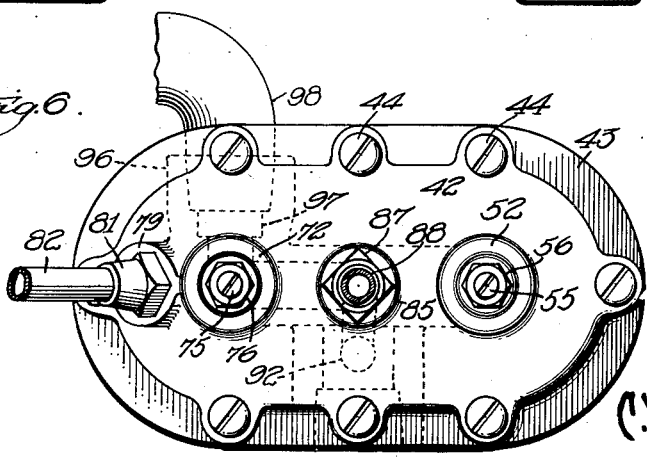
Inventor
EDWARD G. HILL
C. L. Parker Jr.
Attorney

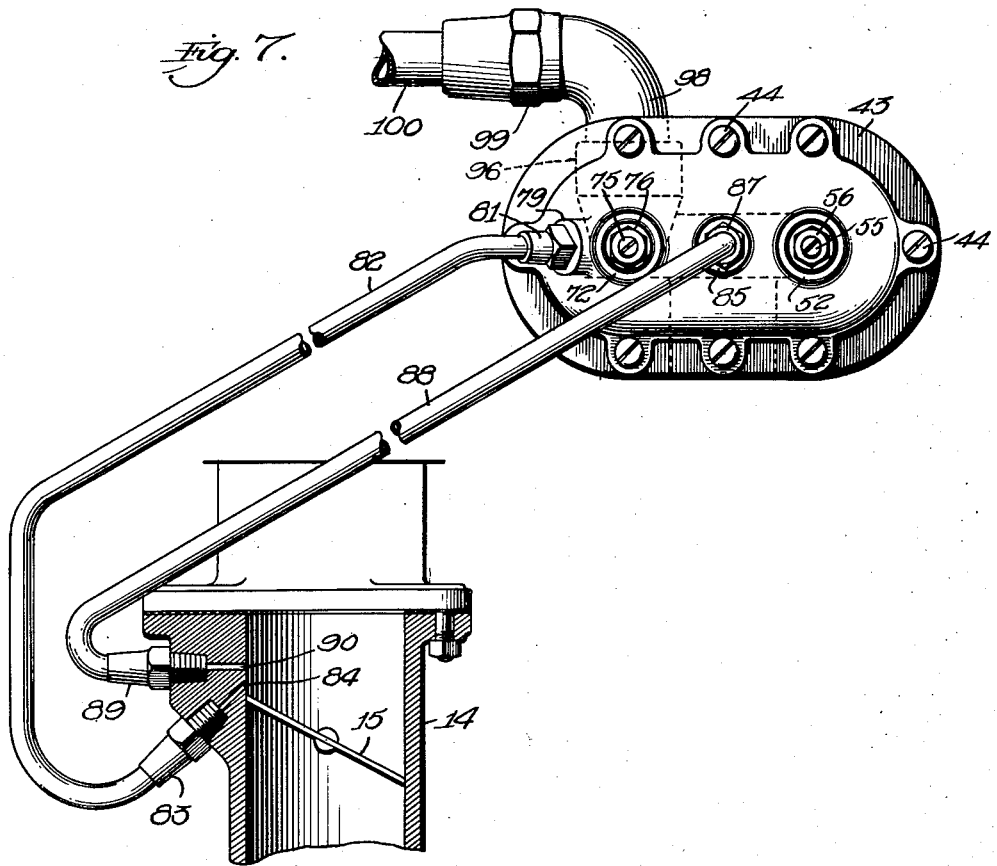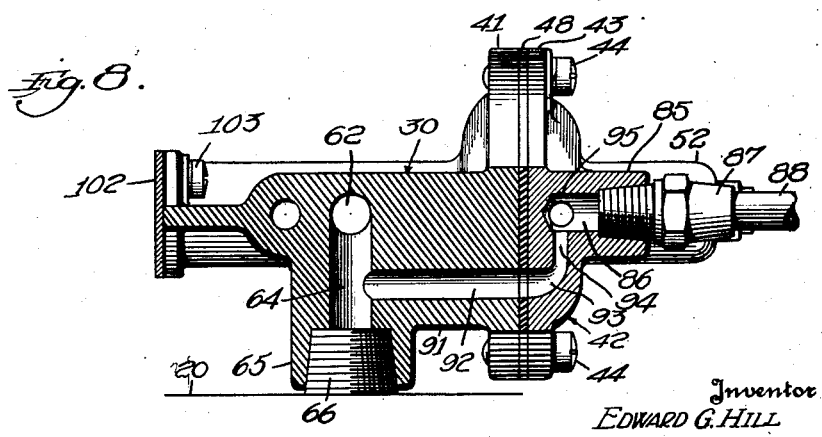

Patented Oct. 8, 1935

2,016,999

UNITED STATES PATENT OFFICE 2,016,999

AUTOMATIC CLUTCH CONTROL APPARATUS

Edward G. Hill, Chicago, Ill., assignor to Hill Engineering Corporation, Richmond, Va., a corporation of Virginia Application April 29, 1933, Serial No. 668,657

20 Claims. (Cl. 192—.01)

This invention relates to automatic clutch control apparatus.

Several forms of apparatus have been developed for operating the clutch of a motor vehicle and controlling the return movement of the clutch elements into operative engagement, and most of these devices are operable by differential pressure through the medium of the vacuum present in the intake manifold of the motor vehicle engine. Several forms of apparatus for this purpose which have proved practicable in operation are shown in the prior patent of Edward G. Hill and Henry W. Hey, No. 1,881,188, patented October 4, 1932, and also in the copending application of Edward G. Hill and Henry W. Hey, Serial No. 587,578, filed January 19, 1932, and my copending application Serial No. 639,110, filed October 22, 1932.

The prior patent and each of the copending applications referred to disclose different forms of clutch control apparatus wherein a differential pressure power device is operable from the suction of the intake manifold to move the clutch elements to inoperative position, and automatic valve means are employed for controlling the return movement of the clutch elements into operative engagement in such a manner as to simulate conventional practice. For example, the apparatus disclosed in copending application Serial No. 587,578 employs a novel form of control valve which is operable in accordance with the differential pressure in the power device to permit relatively rapid movement of the clutch elements substantially to the point of initial engagement and then for stopping the clutch elements in such position to render them subject to subsequent control for bringing them into operative engagement. In Patent No. 1,881,188 referred to above there is disclosed and claimed a valve mechanism automatically operable after actuation of the accelerator pedal for governing the rate of movement of the clutch elements into engagement with each other after their movement has been checked at the point of initial engagement. In my copending application Serial No. 639,110, filed October 22, 1932, further improvements are disclosed and claimed for rendering the operation of the clutch particularly smooth and subject to automatic control for various purposes, one of the principal objects of the apparatus disclosed in the latter application being to greatly improve the maneuverability of the vehicle by automatic means which simulates conventional practice in the operation of the clutch.

The present invention contemplates largely the same objects as the prior constructions referred to except that it is an improvement thereover in several respects. For example, the present invention has for one of its objects the provision of a control valve mechanism which is particularly simple and compact and accordingly subject to economical production.

A further object is to provide a control valve mechanism wherein a single valve structure embodies both the check valve which arrests the movement of the clutch elements substantially at the point of engagement and the bleed valve which governs the movement of the clutch elements into operative engagement after their movement has been arrested.

A further object is to provide improved maneuverability of the vehicle through the use of suitable communicating passages between the power device and the differential pressure operating means for the combined check and bleed valve whereby the latter is influenced to slowly release the clutch elements for movement toward operative engagement or for moving the clutch elements back to or beyond the point of initial engagement in accordance with the manner in which the operator controls the throttle of the vehicle engine through the accelerator pedal.

A further object is to provide a control valve mechanism which lends itself readily to being combined with the power device whereby it may be mounted directly against the latter without the use of any piping connections leading thereto.

Other objects and advantages of the invention will become apparent during the course of the following description.

Figure 2:
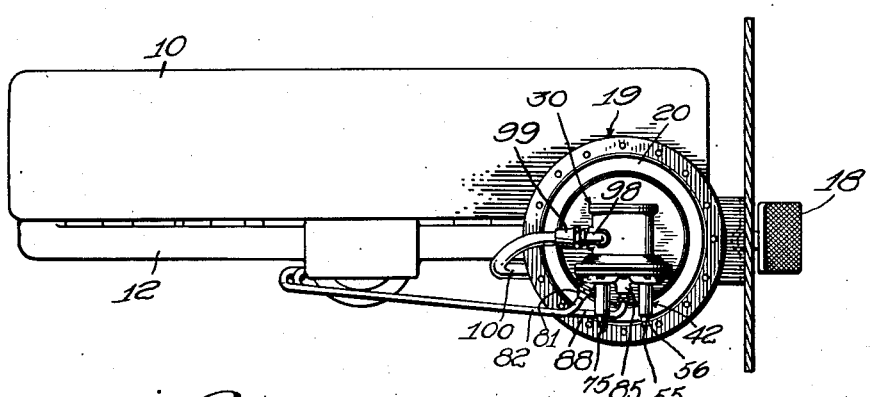

In the drawings I have shown one embodiment of the invention. In this showing,

Figure 1 is a side elevation of the device shown in position with respect to the associated parts of a motor vehicle, the dash being shown in section, Figure 2 is a plan view of the same, Figure 3 is an enlarged horizontal sectional view through the valve mechanism taken on line 3—3 of Figure 1, Figure 4 is a section on line 4—4 of Figure 3, Figure 5 is a similar view on line 5—5 of Figure 3, Figure 6 is an enlarged face view of the head of the valve mechanism, parts being broken away and parts being shown in section, Figure 7 is a somewhat similar view showing the control connections for the intake manifold, and, Figure 8 is a section on line 8—8 of Figure 3.

Referring to Figures 1 and 2, the numeral 10 designates the motor vehicle engine having an intake manifold 11 and an exhaust manifold 12. A carburetor 13 is connected to the intake manifold by a riser 14. The carburetor is provided with a throttle valve 15 operable by an arm 15" connected by suitable means 14' to an accelerator pedal 15'. The vehicle also is provided with the usual clutch indicated as a whole by the numeral 16. The clutch is provided with the usual operating shaft 17 to which is connected a pedal 18.

A power device indicated as a whole by the numeral 19 is adapted to furnish the power necessary for effecting movement of the clutch elements to inoperative position. The particular form of the power device is unimportant, and may be of the identical type shown in the prior patent and copending applications referred to. The power device is preferably of the type employing upper and lower casing sections 20 and 21 having a diaphragm 22 clamped between the adjacent ends thereof and forming the movable member of the power device. Such movable member is provided with a depending rod 23 connected at its lower end as at 24 to one end of a cable 25. The cable passes around a pulley 26 supported on any suitable relatively stationary part of the vehicle by a bracket 27. The other end of the cable is provided with a yoke 28 pivotally connected to the clutch pedal 18 as at 29.

Referring to Figure 3, the numeral 30 designates a valve housing as a whole which is relatively flat and preferably horizontally arranged for direct connection with the top of the power device substantially in the manner shown in Figure 1. The valve housing is provided at one side with a valve cylinder 31 in which is arranged a combined bleed valve and check valve indicated as a whole by the numeral 32. The valve 32 comprises a relatively large head 33 at the end of which is provided a tapered portion 34 forming a bleed valve in a manner to be referred to. Beyond the tapered portion 34, the valve is provided with a cylindrical portion 35 connected to a spaced cylindrical head 36 by a reduced shank 37. The valve portions 34, 35 and 37 control the admission of air through a port 38 into a passage 39 extending through the valve housing. The port 38 and passage 39 preferably form a portion of the same opening drilled horizontally through the valve housing and closed at the end opposite the port 38 by a threaded plug 40.

One end of the valve housing is provided with an enlarged surrounding flange 41. A head indicated as a whole by the numeral 42 is provided with an outstanding flange 43 corresponding in shape to and coinciding in position with the flange 41 and adapted to be secured in position with respect thereto by suitable screws 44. The adjacent face of the valve housing is provided with a relatively large depression 45 communicating with the atmosphere through a small port 46. A diaphragm 47 is adapted to be arranged in the recess 45 and forms a part of a relatively large diaphragm member 48. This diaphragm member corresponds in shape and size to the flanges 41 and 43 and is secured therebetween by the screws 44.

Extending from the head 33, the combined bleed and check valve is provided with a shank 49. The shank has a reduced end extending through the diaphragm 47 and washers 50 are arranged on opposite sides of the diaphragm. A nut 51 secures the diaphragm 47 to the washers 50 and consequently to the shank 49. Accordingly the valve 32 is influenced by and operative in accordance with differential pressures on opposite sides of the diaphragm 47.

The head 42 is provided with a cylindrical extension 52 in which is arranged a spring 53 having one end operating against the outermost washer 50 to tend to urge the valve 32 to the normal position shown in Figure 3. The other end of the spring 53 operates against a spring cup 54 mounted on the end of a screw 55 threaded in the outer end of the extension 52 and adapted to be secured in adjusted positions by a lock nut 56.

The valve housing is further provided with a valve cylinder 57 in which is arranged a main valve indicated as a whole by the numeral 58. This valve includes spaced heads 59 and 60 connected by a reduced shank 61. The normal position of the valve 58 is the position shown in Figure 2, and when in such position, the shank 61 uncovers the adjacent end of the passage 39. The shank 61 wholly uncovers a passage 62 extending partially through the valve housing as shown in Figure 3, when the main valve is in the normal position referred to. The passage 62 is formed by drilling through the edge of the valve housing and the outer end of the drilled opening is closed by a threaded plug 63.

The valve housing 30 is provided with a vertically extending passage 64 communicating at its upper end with the passage 62 as shown in Figure 8. A boss 65 is formed integral with the valve housing and projects downwardly therefrom. This boss communicates with the lower end of the passage 64 and is internally threaded for connection with an upstanding threaded member 66 carried by the upper casing section 20 of the power device. Accordingly it will be apparent that the passage 64 communicates with the top of the power device and is adapted to connect the latter to the atmosphere and/or the intake manifold in accordance with the operation of the valve mechanisms in a manner to be described.

The valve housing 30 is provided with a recess 67, similar to the recess 45, and arranged in axial alinement with the main valve 58. The recess 67 communicates with the atmosphere through a small port 68. A diaphragm 69, forming a part of the diaphragm member 48, is normally arranged in the recess 67. The valve 58 is provided with a reduced extension projecting through the diaphragm 69, and washers 70 are arranged on opposite sides of the diaphragm 69. A nut 71 is clamped on the reduced end of the valve 58 and thus secures the washers 70 to the diaphragm 69.

A cylindrical extension 72 is formed integral with the head 42 and projects therefrom in axial alinement with the valve 58. A spring 73 is arranged in the extension 71 and has one end engaging against the outer washer 70. The other end of the spring 73 engages a spring cup 74 arranged on the end of a threaded stem 75 projecting through the outer end of the extension 72. A lock nut 76 threaded on the outer end of the screw 75 is adapted to maintain the latter in selected positions.

As previously stated, the diaphragms 47 and 69 are normally arranged in their respective recesses 45 and 67. These diaphragms are movable outwardly respectively into recesses 77 and 78 under the influence of differential pressure, in the manner to be described. A boss 79 is formed integral with the valve head and is provided with a passage 80 communicating with the recess 78. A union 81 has one end threaded in the outer end of the passage 80 and is connected to one end of a pipe 82. The other end of the pipe 82 is connected to a union 83 threaded in the riser 14, as shown in Figure 7. The pipe 82 is thus placed in communication with a small passage 84 leading into the interior of the riser 14 adjacent the throttle valve 15.

The head 42 is provided substantially centrally thereof with a boss 85 having a passage 86 extending thereinto, and a union 87 has one end threaded in the outer end of this passage. The other end of the union is connected to one end of a pipe 88 leading to one end of a union 89 also threaded in the riser 14 and communicating with a relatively small passage 90. The passage 90 is arranged a slightly greater distance from the throttle valve 15 than the passage 84, for a purpose to be described.

The under side of the valve body 30 is provided with an enlargement 91 in which is formed a passage 92 drilled through the end of the valve body adjacent the head 42. One end of the passage 92 communicates with the passage 64, as shown in Figure 8. The head 42 is provided with a passage 93 communicating between the passages 86 and 92, and one end of the passage 93 is relatively restricted as at 94. The head 42 also is provided with a short passage 95 leading from the passage 86 to the interior of the diaphragm chamber 77. The valve body 30 is provided with an upwardly extending boss 96 having a passage 97 therethrough communicating at its lower end with the main valve cylinder 57 and normally closed by the valve head 59. The relative position of the passage 97 with respect to the elements of the main valve is shown in dotted lines in Figure 3.

An elbow 98 has one end threaded in the boss 96 and has its other end connected to one end of a union 99. The other end of this union is connected to one end of a conduit 100, and the other end of this conduit is connected to the intake manifold 11 by a suitable fitting 101.

The springs 53 and 73 urge their respective valves 32 and 58 toward their normal positions described above, and the washers which secure the diaphragms to the valves limit the movement of the latter. Such movement may be limited by a cover plate 102, secured against the end of the valve casing by fastening elements 103. Aside from the matter of providing means for limiting the movement of the valves, however, the use of the plate 102 is desirable to partially close the ends of the valve cylinders 31 and 57. The plate 102 is preferably provided with relatively small openings 103' and 104 venting the respective valve cylinders to the atmosphere.

The operation of the apparatus is as follows:

Assuming that the engine is idling with the throttle valve substantially closed, it will be apparent that the maximum vacuum is present above the throttle valve. Accordingly a partial vacuum is established in the diaphragm chambers 77 and 78 to retract the diaphragms 47 and 69 against the tension of their associated springs. In this connection, it will be noted that the vacuum in the riser above the throttle valve is communicated to the chamber 78 through pipe 82, and is communicated to the chamber 77 through pipe 88 and passages 86 and 95.

Under the conditions referred to, the valves 32 and 58 will be arranged in their operative positions, and the passage 39 will be placed in communication with the atmosphere around the valve shank 37 and through port 38. However, the head 60 of the main valve will close the other end of the passage 39, and accordingly the power device will be disconnected from the atmosphere. With the main valve 58 in the position referred to, the space around the shank 61 affords communication between the passages 97 and 62. The passage 97 communicates with the intake manifold through elbow 98 and pipe 100, while the passage 62 communicates with the upper portion of the power device through the passage 64 and boss 66. Accordingly it will be apparent that when the motor is idling, the intake manifold is connected to the power device to move the clutch elements to inoperative position. It also will be apparent that such condition of the apparatus will be established promptly upon movement of the throttle valve to idling position from an open or partially open position.

Assuming that under the conditions referred to the vehicle is at a standstill and the operator is ready to start the vehicle forwardly, the clutch elements will be disengaged ready for the first gear shifting operation. The operator thus places the gear shift lever in low gear position, whereupon he depresses the accelerator pedal to progressively open the throttle valve. The initial opening of the throttle valve establishes substantial communication between the orifice 84 and the atmosphere, thus materially increasing the pressure in the chamber 78. The spring 73 is so adjusted that the initial substantial increase in pressure in the chamber 78 is sufficient to permit the spring 73 to move the main valve to its normal position as shown in Figure 3.

When the main valve is thus returned to normal position, the valve head 59 covers the port 97 and thus disconnects the power device from the intake manifold. At the same time, the space around the shank 69 establishes communication between the passages 39 and 62. Since the valve 32 has not yet been returned to the normal position shown in Figure 3, the port 38 will be still in communication with the passage 39 around the valve shank 37. The instant the main valve returns to its normal position, therefore, substantial communication between the power device and the atmosphere will take place through port 38, passages 39, 62 and 64, and thence through the boss 66. The differential pressure in the power device is thus instantaneously reduced to a point where it is insufficient to hold the clutch elements in inoperative position, and such elements accordingly are promptly moved toward engaged position by the clutch springs.

The initial rush of air into the power device also materially increases the pressure in the chamber 77 through passages 92, 86 and 95, and accordingly the spring 53 will promptly urge the diaphragm 47 toward its normal postion shown in Figure 3. The valve 32 however, does not fully return to normal position for the reason that its movement toward such postion carries the shank 37 out of registration with the port 38 and passage 39, thus tending to restrict the movement of air into the power device almost immediately after initial movement of the air into the passage 39 takes place. Accordingly this restriction of the movement of the air does not permit a sufficient building up of the pressure in the chamber 77 to permit complete movement of the valve 32 to its normal position, and a relatively small opening communicating with the atmosphere will remain due to the fact that the end of the valve head 35 adjacent the shank 37 does not completely close communication between the port 38 and passage 39.

Under the conditions being considered, the differential pressure of the power device is reduced to a point below that necessary to hold the clutch elements disengaged, and as previously stated, the clutch elements thus move toward operative position. During such movement, reduced differential pressure will prevail in the power device, and the degree of vacuum in the upper casing section 20 of the power device will be dependent upon three elements, namely, the area of the diaphragm 22, the speed of movement of the diaphragm, which is determined by the strength of the clutch springs, and the area of communication afforded between the port 38 and passage 39. When the clutch elements initially engage, their movement is retarded to a slight extent, and thus one of the three factors referred to above is changed, namely the speed of movement of the diaphragm, and this action permits the flow of air into the passage 39 to satisfy to a slightly greater extent the partial vacuum existing in such passage and its associated passages. This slightly increased pressure is communicated to the diaphragm chamber 77 through passages 64, 92, 86 and 95, and is sufficient to permit the spring 53 to move the valve head 35 entirely across the port 38. This action completely disconnects the passage 39 from the atmosphere, and the movement of the clutch elements will be completely arrested for the reason that the differential pressure still existing in the power device plus the retarding action due to initial engagement of the clutch elements will be exactly sufficient to overcome the tendency of the clutch springs to move the clutch elements beyond the point indicated. Exact adjustment of the point at which the movement of the clutch elements is arrested is obtained by adjusting the tension of the spring 53.

If the clutch elements should attempt to overrun the predetermined stopping point referred to, such tendency would be due to the fact that air is admitted a little too rapidly into the power device and such admission of air would affect the pressure in the diaphragm chamber 77 to permit the valve head 35 to completely close the end of the passage 39 instead of leaving this passage slightly open to the atmosphere. Accordingly it will be obvious that movement of the clutch elements beyond the point of initial engagement upon return movement of the main valve 58 to the normal position shown in Figure 3 is prevented. On the other hand, if the movement of the clutch elements toward the point of initial engagement should tend to maintain too low a pressure in the upper casing section 20 of the power device, such reduced pressure also will be communicated to the diaphragm chamber 77, thus holding the head 35 open to a slightly greater extent to admit air into the passage 39 somewhat more rapidly. Accordingly the device obviously is self-compensating to secure automatic stopping of the clutch elements at the proper point.

As previously stated, the various operations described take place upon initial movement of the throttle valve toward open position under which condition air is admitted through orifice 84 to substantially increase the pressure in the main valve diaphragm chamber 78. The subsequent operation of the device depends upon further movement of the throttle valve 15 in either direction. In this connection it will be noted that the diaphragm chamber 77 and its associated connections communicate with the riser 14 through pipe 88 and orifice 90, and since the initial opening of the throttle valve which permits return movement of the main valve to normal position does not materially affect the pressure acting through orifice 90 and pipe 1 and the associated passages connected to the latter, the movement of the diaphragm 47 will not be affected by any change in pressure in the pipe 88 upon the initial movement of the throttle valve in the manner referred to.

Further opening movement of the throttle valve however, increases the pressure operating through the pipe 88, and thus the spring 53 acts to move the valve 32 in the direction of its normal position, that is toward the position shown in Figure 3. If the throttle valve is slowly moved, the pressure in the chamber 77 will be slowly built up and corresponding movement of the diaphragm 47 takes place. The initial movement of the diaphragm 47 upon increased pressure in the chamber 77 incident to an increase in pressure through the pipe 88 causes the valve head 35 to immediately completely close the passage 39 and promptly thereafter to move the edge of the head 35 adjacent the tapered section 34 into a position to slowly admit air from port 38 to the passage 39. This air is communicated to the power device around the shank 61 of the main valve, and thence through passages 62 and 64. As the pressure is slowly and progressively built up in the casing section 20 of the power device to decrease the differential pressure present therein, the clutch elements will move slowly into engagement with each other. If the throttle valve is moved somewhat more rapidly in the direction indicated the pressure in the diaphragm chamber 77 will be built up somewhat more rapidly, thus permitting corresponding movement of the valve 32. Under such conditions, the tapered valve section 34 will move to a greater extent to uncover the passage 39 and admit air more rapidly into the power device. Thus it will be apparent that the rate of admission of air into the power device after the movement of the clutch elements has been stopped at the point of initial engagement is directly dependent upon the rate of the opening movement of the throttle valve. Thus the clutch elements are brought into engagement at a rate corresponding to the rate of increase of the engine speed and smooth clutch engagement is provided.

The device provides automatic maneuverability to a remarkable degree. It frequently happens, as when a vehicle is leaving the curb and pulling out into the adjacent line of traffic, that the operator of the vehicle will bring the clutch elements into sufficient engagement to impart slow movement to the vehicle while depressing the accelerator at the same time to somewhat increase the engine speed. If the driver is required to stop or further retard the movement of the vehicle, for example, when other vehicles are approaching, it is the customary practice to move the clutch pedal downwardly slightly and to similarly release the accelerator pedal. Under such conditions the engine will cease to transmit movement to the vehicle and the latter will stop until subsequent operations again place the vehicle in motion.

The present apparatus causes the operation of the clutch in the manner referred to to take place automatically in accordance with accelerator operation. If the driver of the vehicle opens the throttle slightly to release the main valve and thus permits the clutch elements to move rapidly to the point of initial engagement at which point they are stopped, and then slowly opens the throttle to a slightly greater extent, the vehicle engine speed will be slightly increased, while partial clutch element engagement will take place to transmit relatively slow movement to the vehicle. If the operator then slightly releases the accelerator pedal without returning it sufficiently close to idling position to actuate the valve 58, such movement of the throttle valve will reestablish a relatively high degree of vacuum in the chamber 77 to retract the valve 32 to the point where the head 35 will completely close the passage 39. Thus the power device will be cut off from the atmosphere, and the partial vacuum existing in the pipe 88 will act through the restricted orifice 94 and through the passages 92 and 64 to reduce the pressure in the casing section 20 of the power device and thus retract the clutch elements to some extent depending upon the degree of movement of the throttle valve toward idling position.

If, under the conditions stated, the operator does not move the throttle valve a sufficient distance to warrant movement of the clutch elements completely back to their point of initial engagement, as for example, when it is desired merely to retard the movement of the vehicle, the reduced pressure in the pipe 88 and chamber 77 will not be sufficient to permit the head 35 to completely close the passage 39, in which case air will be admitted very slowly into the passage 39, and thus admission of air will be overbalanced by the partial vacuum in the pipe 88 and associated connections. Accordingly the clutch elements will be retracted toward the point of disengagement but will not be disengaged, the movement of the clutch elements corresponding to the degree to which the engine speed is retarded. In other words, the partial vacuum existing in the pipe 88 partially counteracts the admission of air into passage 39, or completely balances such admission of air, depending upon the degree to which the throttle valve is returned toward idling position.

Movement of the throttle toward open position from any preceding position obviously brings the clutch elements progressively into complete engagement by operating the valve 32 to move the tapered section 34 into registration with the passage 35. After the vehicle has gained sufficient momentum in low speed, the accelerator is released to return the throttle valve to idling position, whereupon sufficient vacuum is reestablished in both diaphragm chambers 77 and 78 to actuate the valves and the power device will be again connected to the intake manifold to disengage the clutch. The gearshift lever is then moved into second gear position, whereupon the accelerator may be again depressed to effect movement of the clutch elements. Thus operation is repeated to place the vehicle in high gear, as will be apparent.

The most important feature of the present invention is the production of a relatively cheap and simple valve construction due to the elimination of separate bleed and check valves and the combination of these two valves in a single structure. The head 35 acts as the check valve in conjunction with the shank 37 which initially admits air into the power device to permit movement of the clutch elements to the point of initial engagement, while the tapered section 34 operates as the bleed valve to admit air into the power device, after the movement of the clutch elements has been stopped, and such movement of air into the power device takes place directly in accordance with throttle operation. Accordingly a thoroughly practicable automatic clutch operating device is provided with the use of only two movable valve structures, thus effecting a substantial saving in labor and material, and rendering the valve structure particularly compact. The valve structure is further advantageous for the reason that it is directly connected to the top of the power device, thus eliminating the necessity for piping connections between the valve mechanism and the power device.

Where the expression "normal position" is employed in the following claims, such expression is intended to mean the position to which an element will move in the absence of any specially applied force. For example, the spring 73 urges the main valve 58 to its normal position as shown in Figure 3.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:
1. Motor vehicle control apparatus comprising a power device connected to the motor vehicle clutch, control means for rendering the power device operative to move the clutch elements to inoperative position and for releasing the clutch elements for return movement toward engaged position, and unitary means having portions respectively automatically operative for checking the movement of the clutch elements as they reach substantially the point of initial engagement and for subsequently releasing the clutch elements for controlled movement into operative engagement.

2. Motor vehicle control apparatus comprising a power device connected to the motor vehicle clutch, a control device normally occupying one position and movable to a second position for rendering the power device operative to move the clutch elements to inoperative position, and unitary means having portions respectively automatically operative when said control device is returned from its second position to its normal position for releasing the clutch elements for movement to and checking them substantially at the point of initial engagement and for subsequently releasing the clutch elements for controlled movement into operative engagement.

3. Motor vehicle control apparatus comprising a power device connected to the motor vehicle clutch, a control device normally occupying one position and movable to a second position for rendering the power device operative to move the clutch elements to inoperative position, a control member, and means for operating said control member, said control member having portions respectively automatically operative after said control device is returned from its second position to its normal position for releasing the clutch elements for movement to and checking them substantially at the point of initial engagement, and for subsequently releasing the clutch elements for controlled movement into operative engagement.

4. Motor vehicle control apparatus comprising a power device connected to the motor vehicle clutch, control means for rendering the power device operative to move the clutch elements to inoperative position and for releasing the clutch elements for return movement toward engaged position, unitary means having portions respectively automatically operative for checking the movement of the clutch elements as they reach substantially the point of initial engagement and for subsequently releasing the clutch elements for movement into operative engagement, and means connected to said unitary means to control its operation and govern the rate of movement of the clutch elements into operative engagement substantially in accordance with the rate of operation of the throttle of the motor vehicle engine in proportion to the engine speed.

5. Motor vehicle control apparatus comprising a power device connected to the motor vehicle clutch, a control device normally occupying one position and movable to a second position for rendering the power device operative to move the clutch elements to inoperative position, unitary means having portions respectively automatically operative when said control device is returned from its second position to its normal position for releasing the clutch elements for movement to and checking them substantially at the point of initial engagement and for subsequently releasing the clutch elements for movement into operative engagement, and means connected to said unitary means to control its operation and govern the rate of movement of the clutch elements into operative engagement substantially in accordance with the rate of operation of the throttle of the motor vehicle engine in proportion to the engine speed.

6. Motor vehicle control apparatus comprising a power device connected to the motor vehicle clutch, a control device normally occupying one position and movable to a second position for rendering the power device operative to move the clutch elements to inoperative position, a control member, means for operating said control member, said means being automatically operative after said control device is returned from its second position to its normal position for releasing the clutch elements for movement to and checking them substantially at the point of initial engagement, and being operative for subsequently releasing the clutch elements for movement into operative engagement, and means for controlling said last named means after the movement of the clutch elements has been checked at the point of initial engagement for governing the rate of movement of the clutch elements into operative engagement substantially in accordance with the rate of operation of the throttle of the motor vehicle engine, in proportion to the engine speed.

7. Motor vehicle control apparatus comprising a differential pressure power device connected to the motor vehicle clutch, control valve means for rendering the power device operative to move the clutch elements to inoperative position and for releasing the clutch elements for return movement toward engaged position, and a unitary valve structure having portions automatically operable for checking the movement of the clutch elements as they reach substantially the point of initial engagement and for subsequently releasing the clutch elements for controlled movement into operative engagement.

8. Motor vehicle control apparatus comprising a differential pressure power device connected to the motor vehicle clutch, a control valve normally occupying one position and movable to a second position for rendering the power device operative to move the clutch elements to inoperative position, and a unitary valve structure having portions respectively automatically operative when said control valve is returned from its second position to its normal position for releasing the clutch elements for movement to and checking them substantially at the point of initial engagement, and for subsequently releasing the clutch elements for controlled movement into operative engagement.

9. Motor vehicle control apparatus comprising a differential pressure power device connected to the motor vehicle clutch, a control valve normally occupying one position and movable to a second position for rendering the power device operative to move the clutch elements to inoperative position, a unitary valve structure, and means for operating said unitary valve structure, said valve structure having portions respectively automatically operative after the control valve is returned from its second position to its normal position for releasing the clutch elements for movement to and checking them substantially at the point of initial engagement, and for subsequently releasing the clutch elements for controlled movement into operative engagement.

10. Motor vehicle control apparatus comprising a differential pressure power device connected to the motor vehicle clutch, control valve means for rendering the power device operative to move the clutch elements to inoperative position and for releasing the clutch elements for return movement toward engaged position, a unitary valve structure for automatically controlling the power device, said valve structure having portions respectively operative for checking the movement of the clutch elements as they reach substantially the point of initial engagement and for subsequently releasing the clutch elements for movement into operative engagement, and means connected to said valve structure to control its operation and govern the rate of movement of the clutch elements into operative engagement substantially in accordance with the rate of operation of the throttle of the motor vehicle engine in proportion to the engine speed.

11. Motor vehicle control apparatus comprising a differential pressure power device connected to the motor vehicle clutch, a control valve normally occupying one position and movable to a second position for rendering the power device operative to move the clutch elements to inoperative position, a unitary valve structure having portions respectively automatically operative when said control valve is returned from its second position to its normal position for releasing the clutch elements for movement to and checking them substantially at the point of initial engagement, and subsequently releasing the clutch elements for movement into operative engagement, and means connected to said valve structure to control its operation and govern the rate of movement of the clutch elements into operative engagement substantially in accordance with the rate of operation of the throttle of the motor vehicle engine in proportion to the engine speed.

12. Motor vehicle control apparatus comprising a differential pressure power device connected to the motor vehicle clutch, a control valve normally occupying one position and movable to a second position for rendering the power device operative to move the clutch elements to inoperative position, a unitary valve structure, means for operating said unitary valve structure, said valve structure having portions respectively automatically operative after the control valve is returned from its second position to its normal position for releasing the clutch elements for movement to and checking them substantially at the point of initial engagement, and for subsequently releasing the clutch elements for movement into operative engagement, and means for controlling said last named means after the movement of the clutch elements has been checked at the point of initial engagement for governing the rate of movement of the clutch elements into operative engagement substantially in accordance with the rate of operation of the throttle of the motor vehicle engine in proportion to the engine speed.

13. Motor vehicle control apparatus comprising a differential pressure power device connected to the motor vehicle clutch, a valve casing having a vacuum port connected to the intake manifold of the vehicle engine and an atmospheric port, a main valve normally arranged in a position closing said vacuum port and opening said atmospheric port, means for effecting movement of said main valve to a second position closing said atmospheric port and opening said vacuum port, said valve casing being provided with a third port constantly uncovered by said main valve and communicating with the power device, and a unitary valve having a portion automatically operable for closing said atmospheric port when said main valve returns to normal position and the clutch elements reach approximately the point of initial engagement, said unitary valve being provided with a second portion operative for relatively slowly opening said atmospheric port after the movement of the clutch elements has been checked.

14. Apparatus constructed in accordance with claim 13 provided with spring means urging said main valve toward its normal position, the means for effecting movement of said main valve to its second position comprising a suction chamber, a diaphragm arranged in said suction chamber and connected to the main valve, and a conduit communicating between said suction chamber and the intake manifold of the motor vehicle engine.

15. Motor vehicle control apparatus comprising a differential pressure power device connected to the motor vehicle clutch, a valve casing having a vacuum port connected to the intake manifold of the vehicle engine and an atmospheric port, a main valve normally arranged in a position closing said vacuum port and opening said atmospheric port, means for effecting movement of said main valve to a second position closing said atmospheric port and opening said vacuum port, said valve casing being provided with a third port constantly uncovered by said main valve and communicating with the power device, a unitary valve having a portion automatically operable for closing said atmospheric port when said main valve returns to normal position and the clutch elements reach approximately the point of initial engagement, said unitary valve being provided with a second portion movable to progressively open said atmospheric port after the movement of the clutch elements has been checked, and means for causing said second named portion of the last named valve to open said atmospheric port at a rate corresponding substantially to the rate of operation of the throttle of the motor vehicle engine in proportion to the engine speed.

16. Motor vehicle control apparatus comprising a differential pressure power device connected to the motor vehicle clutch, a valve casing having a vacuum port connected to the intake manifold of the vehicle engine and an atmospheric port, a main valve normally arranged in a position closing said vacuum port and opening said atmospheric port, means for effecting movement of said main valve to a second position closing said atmospheric port and opening said vacuum port, said valve casing being provided with a third port constantly uncovered by said main valve and communicating with the power device, a unitary valve having two portions successively movable into registration with said atmospheric port, means operative when the main valve opens said vacuum port for moving the unitary valve in one direction to a position opening said atmospheric port, and means urging said unitary valve in the other direction and responsive to pressure in the power device incident to initial engagement of the clutch elements for moving the unitary valve in the other direction to bring one of said portions thereof into registration with said atmospheric port to cut off communication with the atmosphere, said last named means being responsive to engine throttle operation to move said unitary valve to bring the other of said portions thereof into progressive registration with said atmospheric port substantially in accordance with the rate of throttle operation in proportion to the engine speed after the movement of the clutch elements has been checked.

17. Motor vehicle control apparatus comprising a differential pressure power device connected to the motor vehicle clutch, a valve casing having a vacuum port connected to the intake manifold of the vehicle engine and an atmospheric port, a main valve normally arranged in a position closing said vacuum port and opening said atmospheric port, means for effecting movement of said main valve to a second position closing said atmospheric port and opening said vacuum port, said valve casing being provided with a third port constantly uncovered by said main valve and communicating with the power device, a unitary valve mounted in said casing, said valve having a portion operative for closing said atmospheric port and a tapered portion operative for progressively opening said atmospheric port, spring means urging said unitary valve in one direction to a position opening said atmospheric port through the tapered portion of said unitary valve, a suction chamber, a pressure responsive member in said chamber connected to said unitary valve, and means connecting said suction chamber to the pressure device and to the intake manifold, said spring means being responsive to an increase in pressure in the power device incident to initial contact of the clutch elements for moving said unitary valve to a position with the first named portion thereof closing said atmospheric port and being responsive to higher pressures in said suction chamber incident to progressive opening of the engine throttle for moving the tapered portion of said unitary valve progressively into registration with said atmospheric port.

18. Motor vehicle control apparatus comprising a differential pressure power device connected to the motor vehicle clutch, a valve casing having three ports communicating respectively with the atmosphere, said power device and the intake manifold of the motor vehicle engine, a main valve having a cut away portion constantly communicating with the power device port and movable to positions respectively opening said atmospheric and manifold ports, means urging said main valve to a normal position opening said atmospheric port, pressure responsive means for moving said main valve to its other position opening the manifold port, a unitary auxiliary valve in said casing, spring means urging said auxiliary valve in one direction to a normal position, said auxiliary valve having a tapered portion opening said atmospheric port when such valve is in normal position, means for moving said auxiliary valve to a second position, opening said atmospheric port when said main valve is in its second position, said auxiliary valve having a second portion movable across said atmospheric port for closing the latter, and means responsive to an increase in pressure in the power device incident to initial contact of the clutch elements for moving said auxiliary valve to cause the second named portion thereof to close said atmospheric port, said last named means being responsive to increased pressures in the intake manifold incident to throttle operation for moving the tapered portion of said auxiliary valve progressively into registration with said atmospheric port at a rate substantially corresponding to the rate of throttle operation in proportion to the engine speed.

19. Motor vehicle control apparatus comprising a differential pressure power device connected to the motor vehicle clutch, a valve casing having three ports communicating respectively with the atmosphere, said power device and the intake manifold of the motor vehicle engine, a main valve having a cut away portion constantly communicating with the power device port and movable to positions respectively opening said atmospheric and manifold port, means urging said main valve to a normal position opening said atmospheric port, pressure responsive means for moving said main valve to its other position opening the manifold port, a unitary auxiliary valve in said casing, spring means urging said auxiliary valve in one direction to a normal position, said auxiliary valve having a tapered portion opening said atmospheric port when said valve is in normal position, means for moving said auxiliary valve to a second position, opening said atmospheric port when said main valve is in its second position, said auxiliary valve having a second portion movable across said atmospheric port for closing the latter, a suction chamber, and a pressure responsive member in said suction chamber connected to said auxiliary valve and responsive to an increase in pressure in the power device incident to initial contact of the clutch elements for causing the first named portion of said auxiliary valve to close said atmospheric port, said pressure responsive member being responsive to increased pressures in the intake manifold incident to throttle operation for moving the tapered portion of said auxiliary valve progressively into registration with said atmospheric port.

20. Apparatus constructed in accordance with claim 19 provided with means connecting said suction chamber to said power device and to the intake manifold adjacent the engine throttle.

EDWARD G. HILL.